US009407131B2

(12) United States Patent
Goodyear et al.

(10) Patent No.: US 9,407,131 B2
(45) Date of Patent: Aug. 2, 2016

(54) POSITIONAL ENCODER AND CONTROL ROD POSITION INDICATOR FOR NUCLEAR REACTOR USING SAME

(71) Applicant: Babcock & Wilcox Nuclear Operations Group, inc., Euclid, OH (US)

(72) Inventors: Brett T. Goodyear, Twinsburg, OH (US); Christopher D. Dodd, Lakewood, OH (US)

(73) Assignee: BWXT Nuclear Operations Group, Inc., Lynchburgh, VA (US)

( * ) Notice: Subject to any disclaimer, the term of this patent is extended or adjusted under 35 U.S.C. 154(b) by 797 days.

(21) Appl. No.: 13/666,003

(22) Filed: Nov. 1, 2012

(65) Prior Publication Data

US 2013/0270929 A1 Oct. 17, 2013

Related U.S. Application Data

(60) Provisional application No. 61/625,135, filed on Apr. 17, 2012.

(51) Int. Cl.
*G01B 7/14* (2006.01)
*H02K 35/02* (2006.01)
*G21C 17/12* (2006.01)
*G21C 7/12* (2006.01)
*G01D 5/04* (2006.01)
*G01D 5/20* (2006.01)

(52) U.S. Cl.
CPC .................. *H02K 35/02* (2013.01); *G01D 5/04* (2013.01); *G01D 5/2033* (2013.01); *G21C 7/12* (2013.01); *G21C 17/12* (2013.01); *Y02E 30/39* (2013.01)

(58) Field of Classification Search
CPC .......................................................... G01B 7/14
USPC .................................................... 324/207.15
See application file for complete search history.

(56) References Cited

U.S. PATENT DOCUMENTS

| 2,469,137 | A | 5/1949 | Strong |
| 3,217,307 | A | 11/1965 | Fogelquist |
| 3,573,513 | A | 4/1971 | Hayosh et al. |
| 3,631,775 | A | 1/1972 | Tidd |
| 3,734,824 | A | 5/1973 | Ripley |
| 3,890,607 | A | 6/1975 | Pelenc et al. |

(Continued)

OTHER PUBLICATIONS

International Search Report and Written Opinion dated Jan. 3, 2014 for PCT/US2013/026471.

*Primary Examiner* — Bot Ledynh
(74) *Attorney, Agent, or Firm* — Nelson Mullins Riley & Scarborough, LLP

(57) ABSTRACT

A cam is immersed in water at an elevated temperature and/or pressure. A reciprocating cam follower also immersed in the water contacts a surface of the cam. The cam follower includes a permanent magnet. An electrically conductive coil is magnetically coupled with the permanent magnet such that movement of the cam follower induces an electrical signal in the electrically conductive coil. A sealed housing also immersed in the water contains the electrically conductive coil and seals it from contact with the water. Leads of the coil are electrically accessible from outside the sealed housing and from outside the water. Alternatively, the cam includes magnetic inserts, the cam follower is replaced by a sensor arm of magnetic material, and the sensor arm and/or the inserts are magnetized whereby rotation of the rotary element causes time modulation of the magnetic coupling and induces coil voltage.

14 Claims, 9 Drawing Sheets

(56) References Cited

U.S. PATENT DOCUMENTS

| | | | |
|---|---|---|---|
| 4,371,496 A | 2/1983 | Lawson, II et al. | |
| 4,556,886 A | 12/1985 | Shimizu et al. | |
| 4,623,507 A | 11/1986 | Gravelle | |
| 5,392,321 A | 2/1995 | Gaussa, Jr. et al. | |
| 5,563,922 A | 10/1996 | Beltz et al. | |
| 5,568,528 A | 10/1996 | Gaussa, Jr. et al. | |
| 5,793,826 A * | 8/1998 | Sato et al. | 376/228 |
| 6,034,624 A | 3/2000 | Goto et al. | |
| 6,642,710 B2 | 11/2003 | Morrison et al. | |
| 6,728,328 B1 * | 4/2004 | Ellsworth | 376/277 |
| 6,876,194 B2 * | 4/2005 | Lin et al. | 324/163 |
| 7,449,878 B2 | 11/2008 | Lee | |
| 2005/0238130 A1 | 10/2005 | McCann et al. | |
| 2011/0222640 A1 * | 9/2011 | DeSantis | 376/229 |
| 2012/0105190 A1 * | 5/2012 | Mitani et al. | 336/221 |
| 2012/0148007 A1 * | 6/2012 | Allen et al. | 376/229 |
| 2012/0155596 A1 | 6/2012 | Kowles et al. | |
| 2012/0212214 A1 * | 8/2012 | Roylance et al. | 324/202 |

* cited by examiner

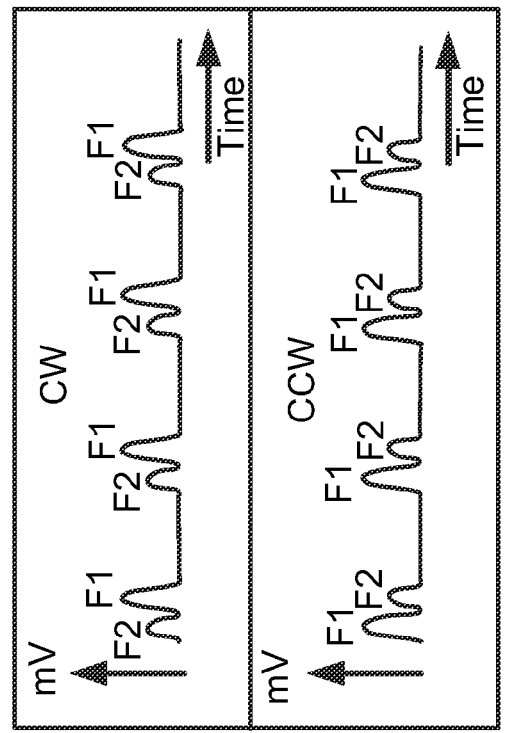
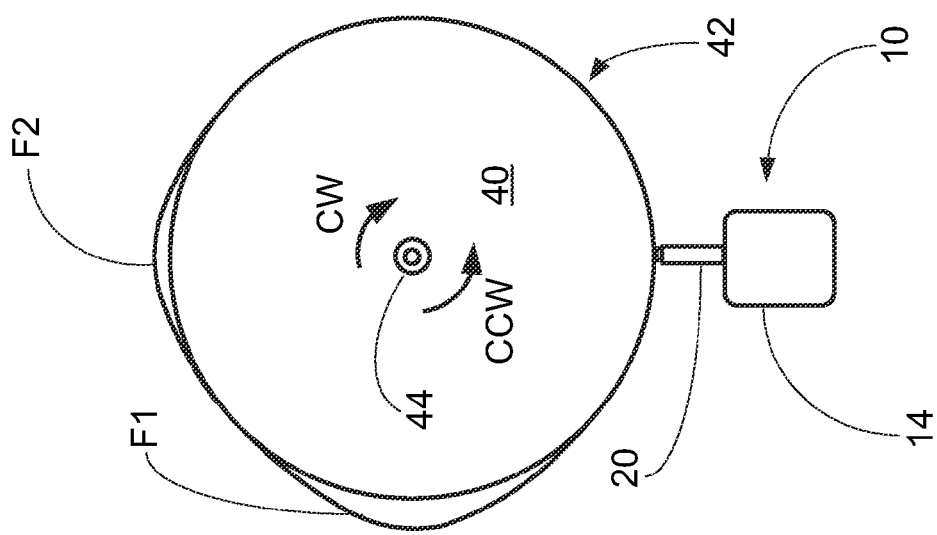
FIG. 2
FIG. 3

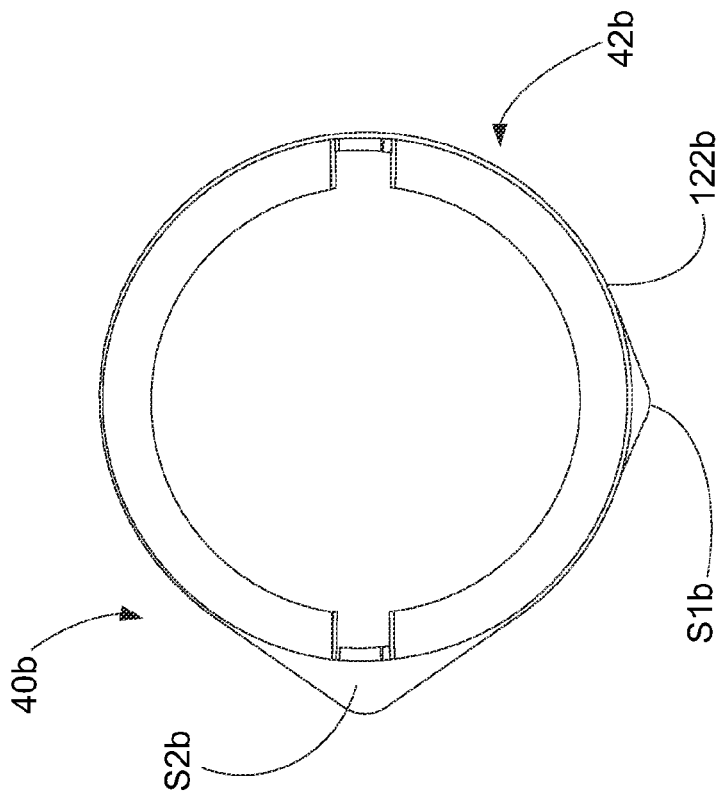
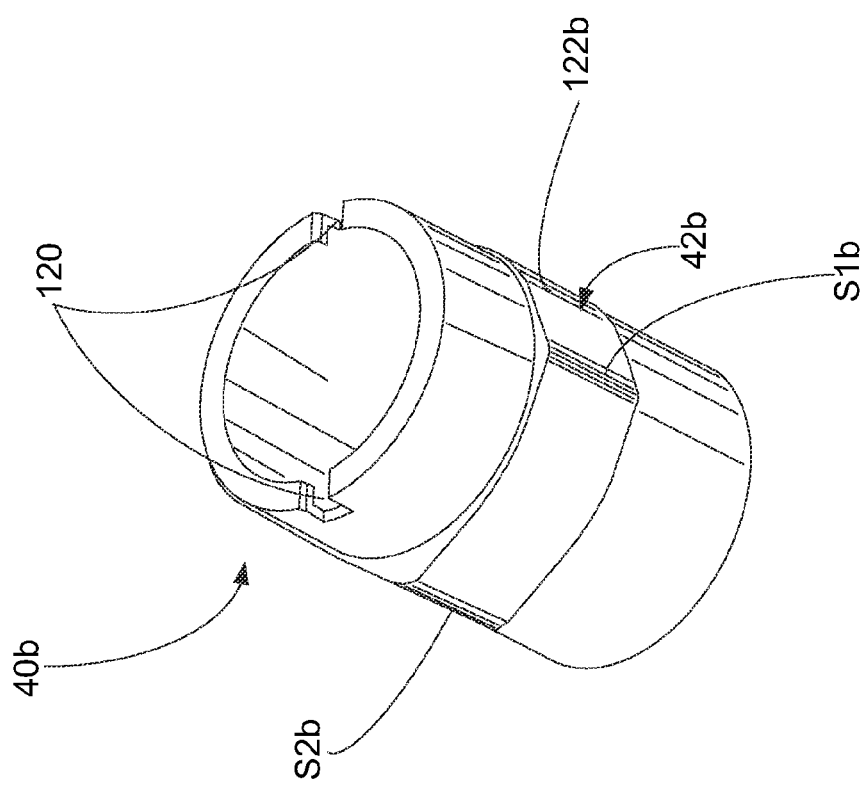
FIG. 9
FIG. 8

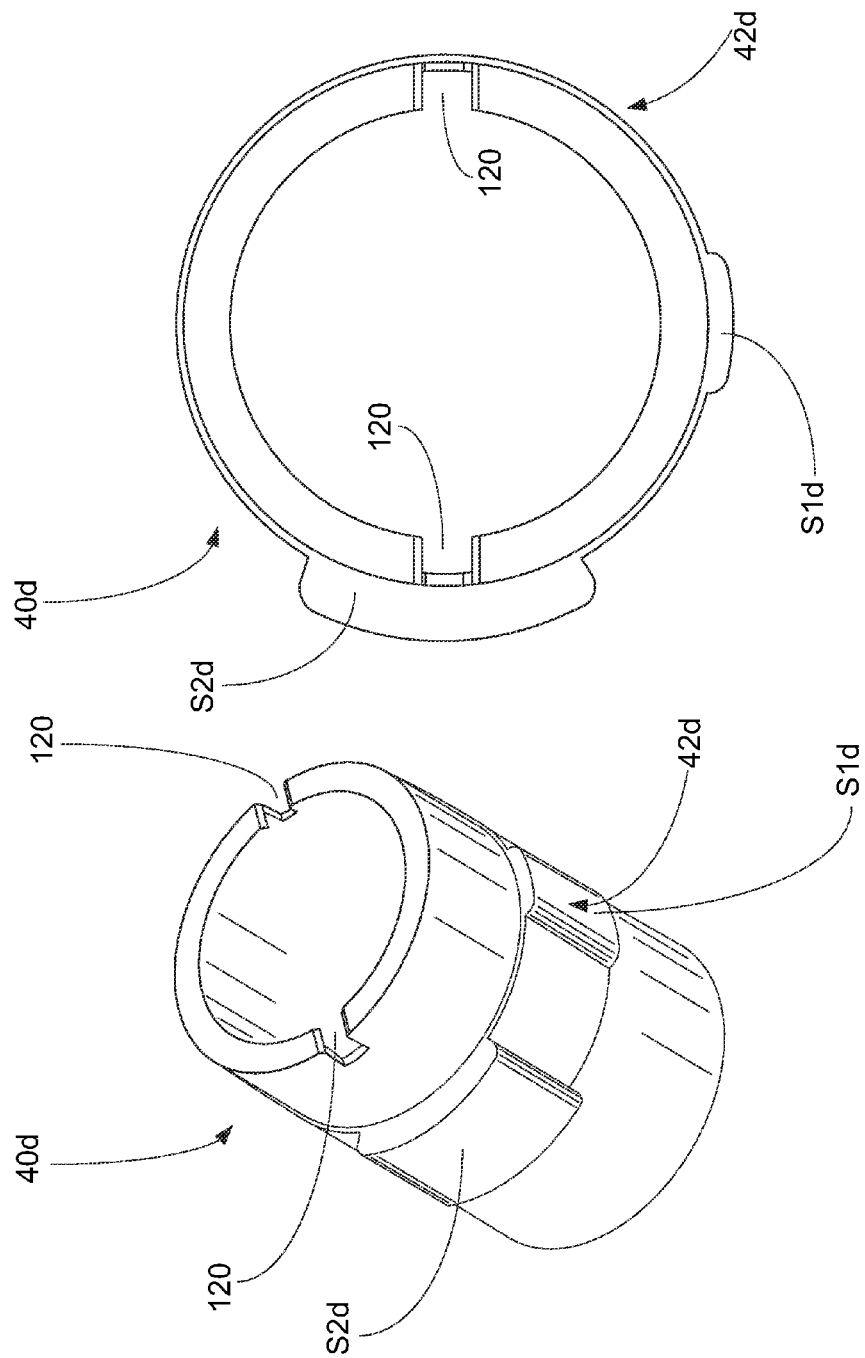

POSITIONAL ENCODER AND CONTROL ROD POSITION INDICATOR FOR NUCLEAR REACTOR USING SAME

This application claims the benefit of U.S. Provisional Application No. 61/625,135 filed Apr. 17, 2012. U.S. Provisional Application No. 61/625,135 filed Apr. 17, 2012 is hereby incorporated by reference in its entirety.

BACKGROUND

The following relates to the positional encoder arts, nuclear reactor arts, nuclear reactor operating arts, and related arts.

Pressure vessels advantageously enable the creation of high pressure environments, which are optionally also at high temperature. For example, nuclear reactors of the pressurized water reactor (PWR) variety employ a pressure vessel to maintain primary coolant water in a sub-cooled state that suppresses void (i.e. bubble) formation and increases efficiency of the primary coolant in performing neutron moderator and thermal transport operations. In one contemplated PWR design, the subcooled primary coolant water is expected to be maintained at a pressure above 16.0 MPa and a temperature above 550° F., with some differences between the hot and cold legs of the primary coolant flow circuit. This is merely an illustrative example, and the design operating temperatures and pressures depend upon the specific reactor design. Other useful applications of pressure vessels include steam drums, various material processing systems that subject material to high temperature and/or pressure, chemical processing systems, and so forth.

Producing motion inside a pressure vessel is a challenging task, due to the high pressure, optional high temperature, and other factors. One approach is external magnetic coupling through the pressure vessel wall, but this approach has practical access limitations. Another approach is to use a bellows, but this also has access limitations, and moreover the long-term mechanical stress on the bellows can lead to component failure. Another approach is to employ a glandless or glanded mechanical vessel penetration, but this has similar problems.

A more flexible approach to providing motion inside a pressure vessel is to employ a canned internal motor that is disposed inside the pressure vessel. For example, the mPower™ reactor design is contemplated to include canned motors disposed inside the reactor pressure vessel for operating the control rod drive mechanisms (CRDMs), and other reactor designs contemplate employing internal reactor coolant pumps (RCPs) with canned motors. These approaches tend to require higher levels of engineering expertise and design since the materials of the motor must be capable of withstanding the high temperature and pressure inside the pressure vessel, and any components immersed in the primary coolant water should also be robust against long-term exposure.

A related problem is to perform measurement of mechanical motion at high temperature and/or pressure. This problem arises in both testing and operational phases of the deployment of a pressure vessel-based system. For example, validation of the mPower™ reactor design is expected to include testing of CRDM units at operational temperature and pressure in a test facility prior to deployment in an operational reactor. While operation of the CRDM may be inferred from measuring electrical input and response of the operating CRDM motor, and from post-testing inspection of the CRDM unit, it would be desirable for the testing to include direct measurement of the motion generated by the CRDM in the pressure vessel at operational temperature and pressure.

Performing motion measurement in a high pressure and/or high temperature environment faces similar problems to those faced in producing motion in such environments. Additionally, cost is a more significant issue, especially for sensors used in testing. It is not desirable for test sensors to be expensive components, since they are not operational elements of the nuclear reactor. However, the test sensors should be robust and reliable in order to produce valid test data.

SUMMARY

In one embodiment, a sensor comprises: an electrically conductive coil; a housing having an unsealed inner volume, the electrically conductive coil being sealed inside the housing and encircling the unsealed inner volume; and a movable element including (i) a permanent magnet that is disposed in the unsealed inner volume and is magnetically coupled with the electrically conductive coil and (ii) a contact portion extending outside the housing, the movable element being movable respective to the housing such that force applied to the contact portion moves the permanent magnet respective to the electrically conductive coil to generate an electrical signal in the electrically conductive coil. The sensor may be a passive sensor that does not receive electrical power and has only two electrical leads.

In accordance with another aspect, an apparatus includes a sensor as set forth in the immediately preceding paragraph, and a rotary cam, and the movable element of the sensor comprises a cam follower engaging a side surface of the rotary cam that is shaped to produce reciprocation of the cam follower when the rotary cam rotates. The apparatus may further include a readout device connected to measure the electrical signal generated in the electrically conductive coil, an electronic data processing device configured to compute a rotation rate or rotation distance of the rotary cam based on the measured electrical signal. The rotary cam may be a nut of a control rod drive mechanism (CRDM) that engages a screw of the CRDM, and the electronic data processing device may be further configured to compute a linear translation rate or linear translation distance of the screw based on the computed rotation rate or rotation distance and a thread pitch of the screw. In accordance with another aspect, an apparatus includes a sensor as set forth in the immediately preceding paragraph, and a control rod drive mechanism (CRDM) including a screw or a rack, wherein the movable element of the sensor comprises a cam follower engaging the screw or rack such that threads of the screw or gear teeth of the rack produce reciprocation of the cam follower as the cam moves linearly.

In accordance with another aspect, an apparatus comprises: a cam immersed in water at a temperature of at least 212° F.; a reciprocating cam follower contacting a surface of the cam, the reciprocating cam follower also immersed in the water, the reciprocating cam follower including a permanent magnet; an electrically conductive coil magnetically coupled with the permanent magnet of the reciprocating cam follower such that movement of the cam follower induces an electrical signal in the electrically conductive coil; and a sealed housing immersed in the water and containing the electrically conductive coil, the sealed housing sealing the electrically conductive coil from contact with the water, leads of the electrically conductive coil being electrically accessible from outside the sealed housing and from outside the water. The sealed housing may have an unsealed inner cavity in which the cam follower is mounted, the permanent magnet of the cam follower being disposed inside the cavity, the cam follower including a contact portion extending out of the cavity and contacting a surface of the cam.

In accordance with another aspect, an apparatus comprises: a rotary element made of a non-magnetic material with a side surface having one or more inserts made of a magnetic material; a sensor arm made of a magnetic material, the sensor arm contacting the side surface of the rotary element; an electrically conductive coil magnetically coupled with the sensor arm wherein at least one of (i) the sensor arm and (ii) the inserts of the rotary element are magnetized such that rotation of the rotary element causes time modulation of the magnetic coupling between the electrically conductive coil and the sensor arm so as to induce a voltage in the electrically conductive coil; and a sealed housing containing the electrically conductive coil, leads of the electrically conductive coil being electrically accessible from outside the sealed housing.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

FIG. 2 diagrammatically shows a plan view of the sensor engaging the cam wherein the cam includes an asymmetric set of two features.

FIG. 3 diagrammatically shows an electrical signal produced by the sensor operating as shown in FIG. 2, wherein the electrical signal includes a signal feature (top plot) or a distinguishable time-reversed signal feature (bottom plot) in the measured electrical signal depending upon rotation direction of the rotary cam.

FIGS. 8 and 9 show perspective and end views, respectively, of another cam suitably employed in the sensor system of FIGS. 1 and 2.

FIGS. 12 and 13 show perspective and end views, respectively, of another cam suitably employed in the sensor system of FIGS. 1 and 2.

DETAILED DESCRIPTION OF THE PREFERRED EMBODIMENTS

Disclosed herein are sensors for measuring motion in high temperature and/or high pressure environments. The sensors are described with particular reference to the application of testing and/or monitoring an internal control rod drive mechanism (CRDM) of a nuclear reactor, such as the contemplated Babcock & Wilcox mPower™ PWR design. However, the disclosed sensors can be constructed at low cost and with high reliability, and are expected to find use in substantially any motion measurement application performed inside a pressure vessel at high pressure (and, optionally, high temperature). The disclosed sensors are also expected to find use in other environments, such as monitoring motion in a boiling water environment at atmospheric pressure (e.g., water in a liquid or mixed liquid/steam phase at or above 212° F.). The disclosed sensors employ a combination of a sealed electrically conductive coil magnetically coupled with an unsealed cam follower that engages a surface of the object (i.e., a cam) that is undergoing motion measurement. This design advantageously seals the sensitive coil component, but does not seal the cam follower.

The disclosed sensors can be constructed as passive components employing a cam follower with a permanent magnet that magnetically couples the cam follower with the sealed electrically conductive coil. As a passive component, the sensor does not require any operating power and accordingly requires only two signal leads to pass through the pressure vessel. This minimal electrical wiring is advantageous in an environment such as a nuclear reactor in which a significant portion of the electrical cabling is mineral insulated (MI) cabling having a relatively large minimum bend radius that makes cable routing inside the reactor a complex endeavor.

Figure 1:
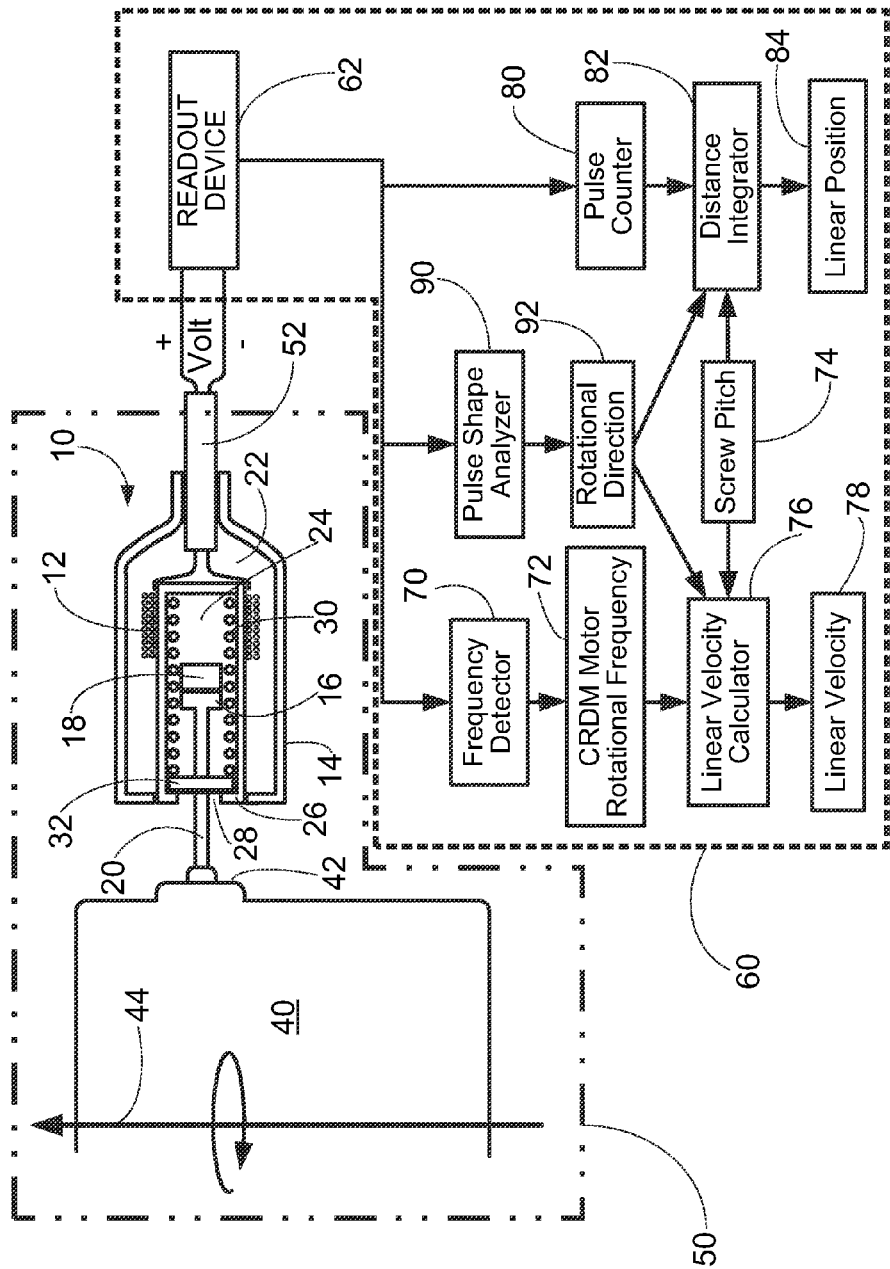
FIG. 1 diagrammatically shows a sensor system operating to encode speed or position of a rotary cam.

With reference to FIG. 1, a sensor 10 includes an electrically conductive coil 12 sealed in a housing 14, and a movable element 16 including a permanent magnet 18 and a contact portion 20. The housing 14 includes a sealed outer volume 22 containing the electrically conductive coil 12, and a cavity or unsealed inner volume 24 in which the movable element 16 is mounted with the magnet 18 disposed inside cavity 24. In the illustrative sensor 10, the unsealed inner volume 24 is defined in part by a wall 26 having an opening 28 out of which the contact portion 20 of the movable element 16 extends, and a spring 30 biases a stop 32 of the movable element 16 against the wall 26.

The movable element 16 of the sensor 10 is a reciprocating cam follower 16 whose contact portion 20 contacts a surface of a cam 40. The surface of the cam 40 that is contacted by the cam follower 16 is a cam surface 42, and is contoured so that as the cam surface 42 moves respective to the cam follower 16 it causes the cam follower 16 to reciprocate, i.e. to move linearly back-and-forth. The illustrative cam 40 is a rotary cam that is shown only in part in FIG. 1; the rotary cam 40 rotates about a rotational axis 44. In operation, the compressed spring 30 pushes the contact portion 20 of the cam follower 16 against the cam surface 42, and as the cam 40 rotates the cam surface 42 passes over the contact portion 20 and, when the surface contour transitions to higher relief, it pushes the cam follower 16 further into the unsealed cavity 24 against the force of the compressed spring 30. When the surface contour pressing against the contact portion 20 transitions to lower relief as the cam 40 rotates, the spring 30 returns the cam follower 16 to its rest position in which the stop 32 is pressed against the wall 26 of the cavity 24. (Note: depending upon the lowest relief of the cam surface 42 and the position of the sensor 10 respective to the cam 40, in some embodiments the cam follower 16 may never return completely to the rest position. That is, in some embodiments the cam surface 42 presses the cam follower 16 some distance into the cavity 24 even at the lowest relief point of the cam surface 42). As the rotary cam 40 rotates over multiple revolutions, the cam follower 16 thus follows the cam surface 42 between its lowest and highest relief points, thus producing a reciprocating (i.e. back-and-forth) motion of the cam follower 16 responsive to rotation of the cam 40. The reciprocating movement of the cam follower 16 includes reciprocating movement of the permanent magnet 18 which is part of the cam follower 16. Reciprocation of the permanent magnet 18 produces a time-varying magnetic field inside the coil 12 which encircles the magnet 18. In accord with Maxwell's equations, this time-varying magnetic field generates a time-varying voltage in the electrically conductive coil 12 (and a time-varying electric current in the coil 12 if it is connected with an electrically conductive electrical circuit).

The sensor 10 and the cam 40 are disposed in a pressure vessel 50 (diagrammatically indicated by a containing polygon in FIG. 1) containing an ambient, e.g. water, held at a certain temperature and pressure by the pressure vessel 50 and ancillary components (not shown). The sensor 10 and cam 40 are immersed in the water (or other ambient); however, because the electrically conductive coil 12 is sealed inside the housing 14 (e.g., is located inside the sealed volume 22), the electrically conductive coil 12 is not exposed to the water (or other ambient).

The cam follower 16 includes the magnet 18. In a suitable embodiment, the cam follower 16 is a rod having one end protruding out the opening 28 of the cavity 24 to form the contact portion 20, and the opposite end disposed inside the cavity 24 and encircled by the electrically conductive coil 12. The magnet 18 is preferably a permanent magnet, by which it is meant that the magnet 18 has sufficient permanent magnetization to generate an effective voltage in the electrically conductive coil 12. In some embodiments the cam follower 16 includes a ferromagnetic main body and the permanent magnet 18 is separate from the ferromagnetic main body and is magnetically connected to the ferromagnetic main body. Alternatively, the entire cam follower 16 can be a single piece (e.g. a single machined or cast ferromagnetic element) that is magnetized, so that the entire cam follower forms the magnet (embodiment not shown). The cavity 24 is an unsealed cavity, so the cavity 24 is filled with the ambient (e.g., water) contained in the pressure vessel 50. This means that the cam follower 16 including the magnet 18, as well as the spring 30, are exposed to the water (or other ambient). However, these components can be made of material such as steel that is robust against high temperatures and pressures. The magnet 18 is made of any suitably robust material that can be permanently magnetized with sufficient magnetization. In some embodiments, the magnet 18 is a samarium cobalt (SmCo) magnet; however, other magnetic materials are also contemplated.

With continuing reference to FIG. 1, electrical leads of the electrically conductive coil 12 of the sensor 10 are electrically accessible from outside the pressure vessel 50. For example, in the illustrative embodiment the leads are connected with a (diagrammatically indicated) mineral-insulated cable (i.e., MI cable) 52 that passes through (or electrically connects to) a vessel penetration passing through the wall of the pressure vessel 50. This approach is suitable, for example, in a nuclear reactor where MI cabling is commonly used for electrical interconnects inside the reactor. Advantageously, the sensor 10 is a passive device and includes only two signal leads (connecting to the electrically conductive coil 12) and no power leads.

To provide movement measurement, the output of the sensor 10 connects with an electronic data processing device 60, such as a computer, microcontroller or microprocessor with suitable ancillary electronics (memory, et cetera), or so forth to implement data processing to convert the electrical signal of the coil 12 to a movement measure. In illustrative FIG. 1, the electronic data processing device 60 includes (or is connected with) a readout device 62 that generates a digitized representation of the electrical signal induced in the coil 12 by reciprocation of the magnet 18 responsive to movement of the cam surface 42. The readout device 62 may, for example, be a standalone voltage meter with a digital output, or may be an analog to digital converter (ADC) card installed in a computer embodying the electronic data processing device 60. The output of the readout device 62 is a digital representation of the voltage-versus-time signal read from the coil 12, for example as a time sequence of digitized voltage samples acquired from the coil 12 by the readout device 62.

The processing of the readout voltage versus time signal depends upon the nature of the mechanical motion being measured. For example, if the rotary cam 40 is expected to be at a constant rotation speed, then the contouring of the cam surface 42 is expected to produce a voltage-versus-time signal with a frequency component equal to the rotation frequency (or to a multiple thereof). For example, if the cam surface 42 is a side surface of the rotary cam 40 of constant radius except for a single feature (e.g., a bump or depression) located at a single discrete point along the circumference of the side surface, then the voltage versus time signal should have a single pulse per revolution of the cam 40, due to movement of the magnet 18 caused by the cam follower 16 passing over the feature. Thus, a frequency detector 70, such as a fast Fourier transform (FFT) processor, suitably detects the frequency of the pulses which equals the rotation speed of the cam 40. If the cam 40 is a nut driving a screw, as in the case of a control rod drive mechanism (CRDM) of a nuclear reactor employing a nut/screw mechanism, then this frequency is a CRDM motor rotational frequency 72. (This assumes that the cam 40 is a nut forming the rotor of a CRDM motor). If the screw pitch 74 of the screw is known, then a linear velocity calculator 76 can compute the linear velocity 78 of the screw (which is assumed here to carry the control rod assembly) as rotation speed times thread pitch. Note that this approach can track changes in the rotational speed of the cam 40 so long as those changes are on a long enough time scale for the FFT or other frequency detector 70 to track the changes in rotational frequency. Also, the one-to-one ratio between electrical frequency and mechanical rotation speed may not necessarily hold: For example, if the cam surface 42 includes two features spaced 180° apart along the circumference of the side wall of the rotary cam 40, then two pulses per revolution will be observed in the voltage-versus-time signal (one for each feature), and so the electrical frequency will be twice the mechanical rotation frequency. This can be readily accounted for in the data processing based on the known contour of the cam surface 42.

If the cam 40 is not expected to rotate at a constant rate, the sensor 10 can still be used to track rotational motion and (in the case of a nut/screw assembly) linear motion of a driven screw. In this approach, a pulse counter 80 counts the pulses in the voltage versus time signal. If the cam surface 42 includes a single feature (bump or depression), then each pulse corresponds to a single revolution of the cam 40, and so a distance integrator 82 can compute the screw translation distance since each counted pulse corresponds to a linear translation equal to the thread pitch 74. If the initial position of the screw is known, then this integrated distance yields a linear position 84 for the screw.

With reference to FIGS. 2 and 3, if the cam surface contouring is suitably constructed then the sensor 10 can additionally or alternatively be used to determine rotation direction of the rotary cam 40. FIG. 2 shows a plan view (i.e., top or bottom view) of the cam 40 with its cam surface 42, which in this example includes a first feature F1 (a bump, in this case, although a depression could alternatively be employed) and a second feature F2 that is different from the first feature F1. In the illustrative example, feature F1 is a larger bump than feature F2. Moreover, there is asymmetry in the spacing of features F1, F2 around the circumference of the cam surface 42, in that the two features F1, F2 are not spaced apart by 180°. FIG. 2 also diagrammatically shows the sensor 10 including the housing 14 and the contact portion 20 of the cam follower protruding from the housing 14 to contact the cam surface 42. FIG. 2 also indicates clockwise (CW) and counterclockwise (CCW) rotation directions. FIG. 3 plots pulses in the voltage versus time signal for clockwise rotation (top plot) and for counterclockwise rotation (bottom plot) of the cam 40. In clockwise rotation (top plot), the contact portion 20 contacts feature F2 followed quickly by encountering feature F1, followed by a long interval and then repeating. That is, in the clockwise direction the pattern is " . . . F2F1---F2F1---F2F1 . . . ". On the other hand, in the counterclockwise direction (bottom plot) the contact portion 20 contacts feature F1 followed quickly by encountering feature F2, followed by a long interval and then repeating. That is, in the counterclockwise direction the pattern is " . . . F1F2---F1F2---F1F2 . . . ". While FIG. 2 shows two asymmetrically positioned bumps F1, F2 of different heights, more generally the direction detection employs an asymmetric set of one or more features that produce either (1) a signal feature for rotation in one direction or (2) a distinguishable time-reversed signal feature for rotation in the opposite direction. The set of features could be as few as a single feature, e.g. a bump having a sharp slope on one side and a shallow slope on the other side to produce an asymmetric pulse in the voltage versus time signal.

With returning reference to FIG. 1, the rotational direction determination approach described with reference to FIGS. 2 and 3 is suitably implemented by a pulse shape analyzer 90 that analyzes the shape of pulses (or pulse groups) in the voltage-versus-time signal, and determines a rotational direction 92 based on the pulse shape, where it is understood that the pulse shape for rotation in one direction will be the time-reversed version of the pulse shape for rotation in the opposite direction. The pulse shape analyzer 90 suitably normalizes the electrical frequency (or the spacing between pulses) to normalize for rotation speed.

Figure 4:
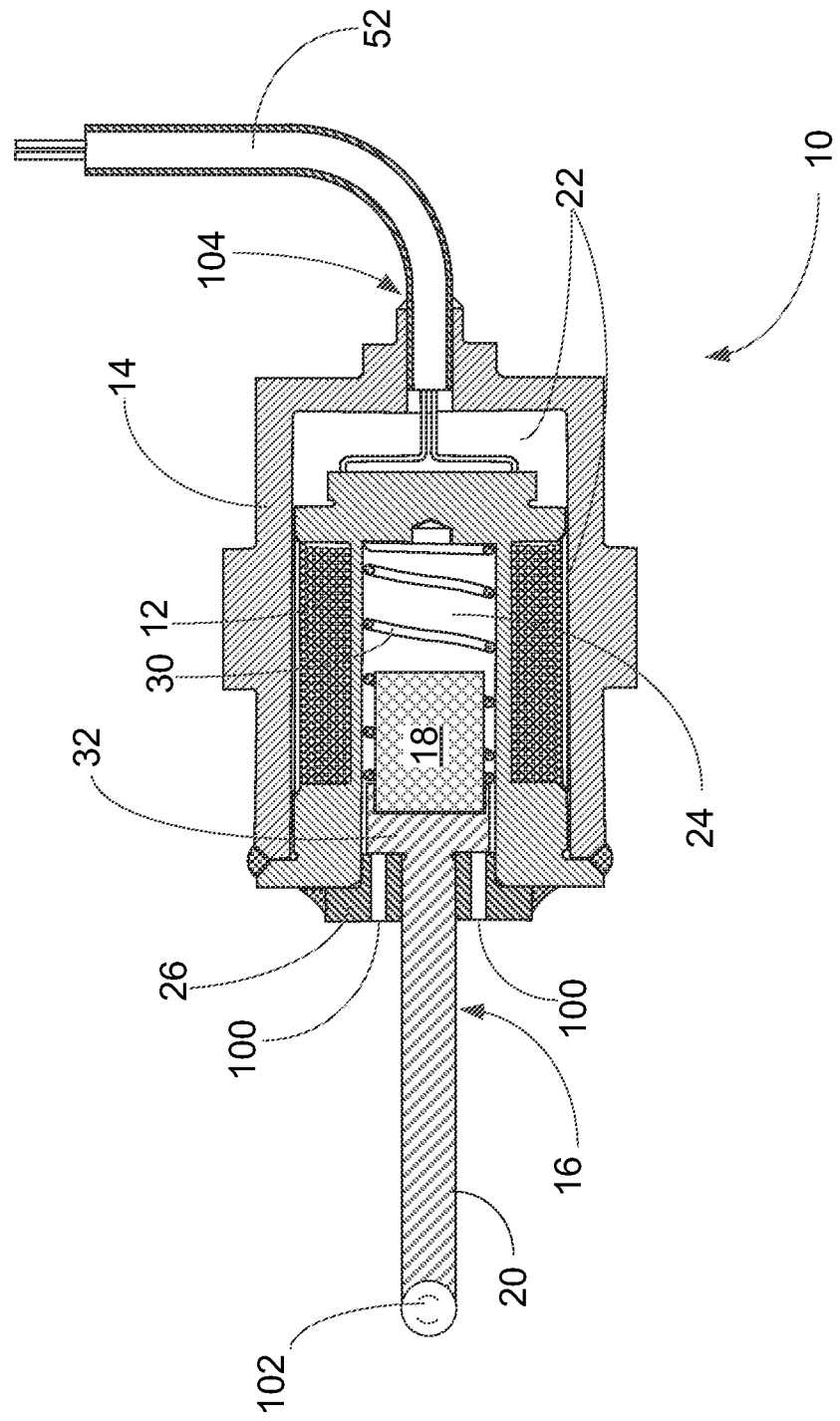
FIGS. 4 and 5 diagrammatically show side sectional and perspective views, respectively, of an embodiment of the sensor of FIG. 1.
Figure 5:
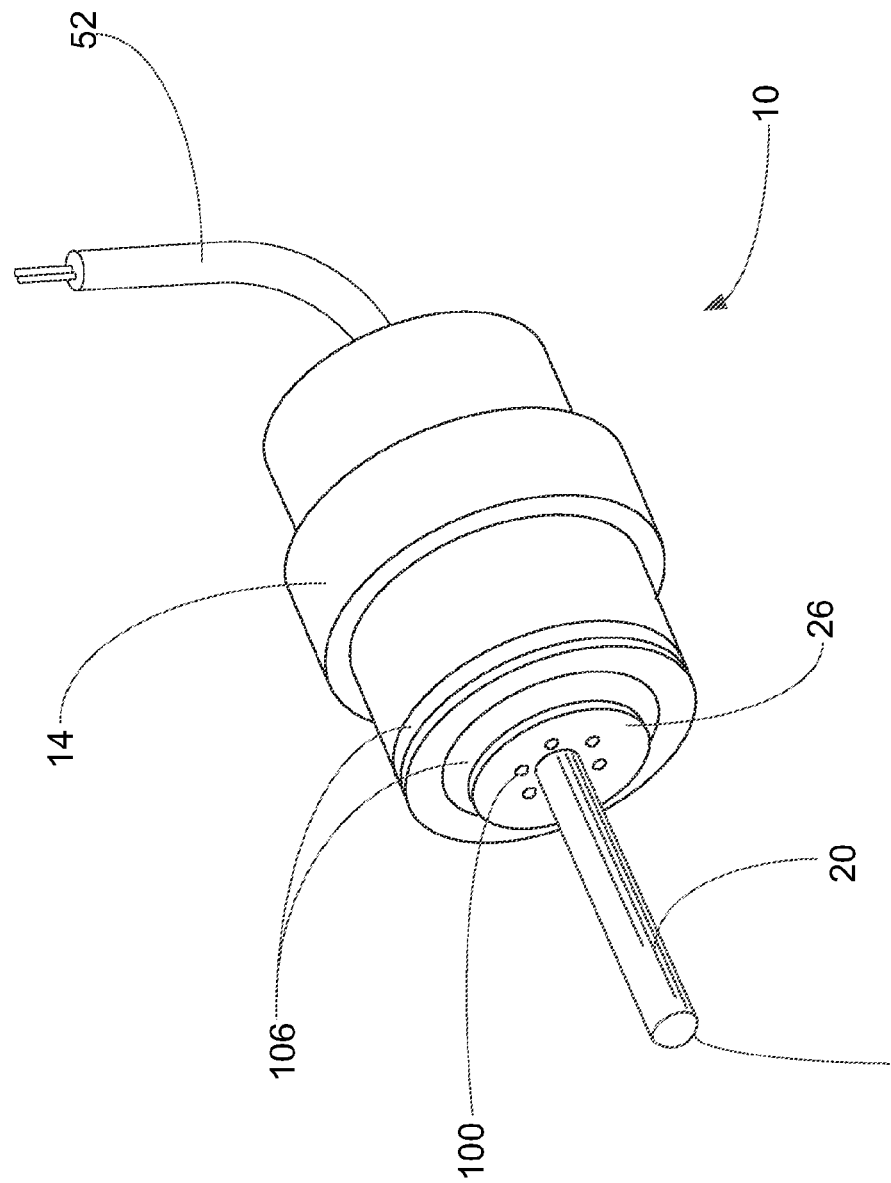

With reference to FIGS. 4 and 5, side sectional and perspective views of one embodiment of the sensor 10 of FIG. 1 are shown. The illustrative sensor 10 includes the aforementioned electrically conductive coil 12 sealed in the housing 14 with sealed outer volume 22 and unsealed inner volume or cavity 24, the movable element, i.e. cam follower 16 including the permanent magnet 18, contact portion 20, and stop 32 engaging the wall 26, and the spring 30. The magnet 18 is magnetically held to the body of the cam follower 16, which as seen in FIG. 4 also has a "cup" or recess formed into it to help hold the magnet 18. In the embodiment of FIGS. 4 and 5, there is no seal between the opening in the wall 26 and the protruding contact portion 20 of the cam follower 16, but the fit is relatively tight so that water flow might be constricted through the gap between wall 26 and contact portion 20. Such constriction in the water flow could be detrimental since water pressure inside the cavity 24 could create hydraulic impedance to movement of the cam follower 16. Accordingly, in the embodiment of FIGS. 4 and 5 the wall 26 includes flow holes 100 to provide enhanced fluid communication between the unsealed cavity 24 and the outside ambient (e.g. water).

The illustrative sensor 10 of FIGS. 4 and 5 also includes a ball bearing 102 at the tip of the contact portion 20. Such a ball bearing, while optional, can facilitate unimpeded movement of the cam surface 42 across the contact portion 20. Other smoothing approaches can be employed, such as having the tip of the contact portion 20 be a single piece (i.e., no ball bearing) but rounded to reduce friction, and/or applying a lubricating solid coating to the tip, or so forth. As seen in FIG. 4, the MI cable 52 is welded to the housing 14 at an annular weld 104, and further welds 106 (shown in FIG. 5) secure the wall 26 to the main body of the housing 14, so as to ensure sealing of the outer volume 22 containing the electrically conductive coil 12. It will be appreciated that the sensor 10 of FIGS. 4 and 5 is a single component that is readily installed in any high temperature and/or high pressure environment.

The strength of the electrical signal (e.g. voltage) induced in the electrically conductive coil 12 during operation of the sensor 10 depends upon numerous factors. The magnetization of the magnet 18 is one apparent factor, which can be improved by using a highly magnetizable material such as SmCo. Another factor is the number of turns (N) of the coil 12, as the induced voltage is (at least approximately) proportional to N. In the sensor of FIGS. 4 and 5, the electrically conductive coil 12 includes several layers of turns. The overall geometry also impacts the electrical signal. If the magnet is placed in the middle of a long coil, then the change in magnetic flux through the coil may not change significantly as the magnet moves. In the embodiment of FIGS. 4 and 5, the magnet 18 is placed so that it is at one end of the encircling coil 12 when the cam follower 16 is in its rest position (i.e., with the stop 32 pressed against the wall 26 by the compressed spring 30). In this geometry, when the contact portion 20 is pushed to move the cam follower 16 (further) into the cavity 24, this causes the magnet 18 at the end of the coil 12 to be pushed into the coil 12, which geometry should provide a larger change in magnetic flux through the coil 12.

Another factor impacting the strength of the electrical signal (e.g. voltage) induced in the electrically conductive coil 12 during operation of the sensor 10 is the contouring of the cam surface 42. As per Maxwell's equations, the voltage induced in a coil is dependent on the rate of change of the magnetic flux through the coil, rather than being dependent on the magnitude of the magnetic flux through the coil. As a consequence, rapid relief changes in the cam surface 42 are expected to provide a larger signal than gradual relief changes. This motivates toward, for example, having the rotary cam 40 with its cam surface 42 being a side surface of the rotary cam 40 having a constant radius except for one (or more) sharp bumps or depressions. Each bump or depression produces a large-amplitude pulse in the coil. In the same vein, the rate of change in magnet position (or, equivalently, the reciprocation rate) also depends on the rotation speed of the rotary cam 40, with the signal being expected to increase with increasing rotation speed (this assumes the cam does not rotate so fast that the cam follower cannot follow the contouring of the cam surface). It is expected that for a sensor 10 having the configuration shown in FIGS. 4 and 5, and employing a 0.5-inch SmCo magnet, voltages of order 150-200 millivolts can be induced in the coil at a cam rotation speed of 75 rpm.

With reference to FIGS. 6-13, some illustrative embodiments of the cam 40 are described.

Figure 7:
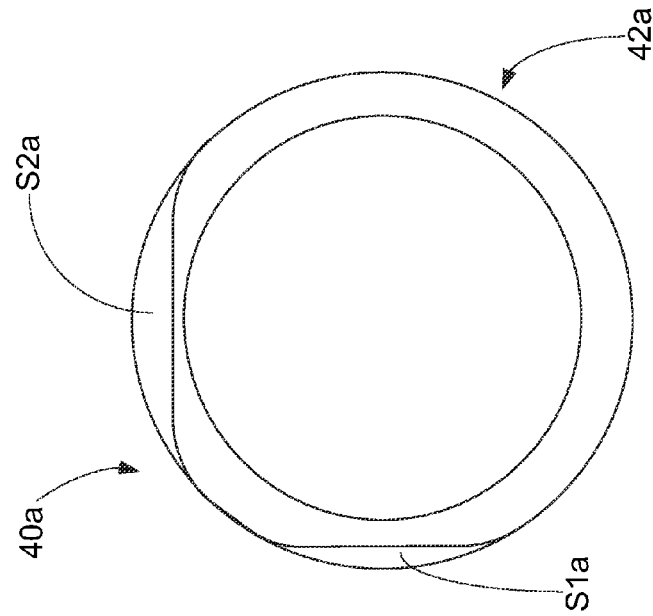
FIGS. 6 and 7 show perspective and end views, respectively, of a cam suitably employed in the sensor system of FIGS. 1 and 2.
Figure 6:
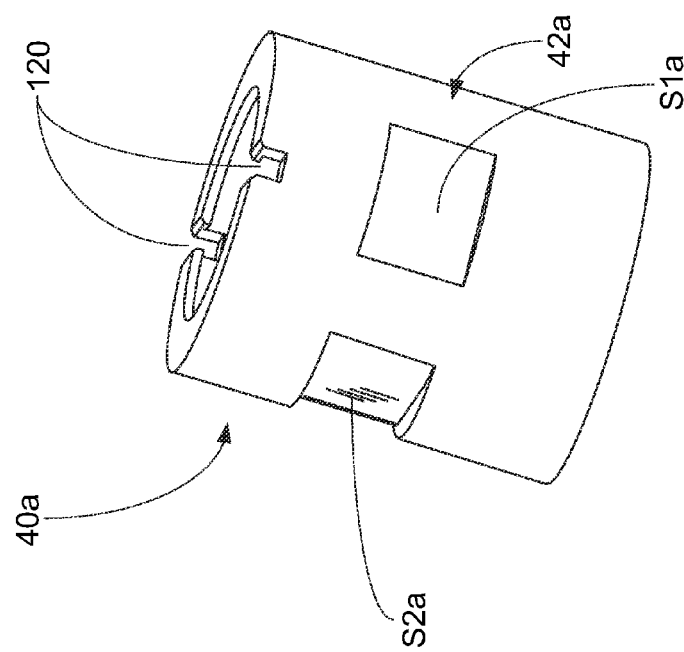

FIGS. 6 and 7 show perspective and end views, respectively, of a cam 40a comprising a lock sleeve with a cam surface 42a that is a side surface of the sleeve with slots S1a, S2a of machined into the sleeve to serve as features for causing reciprocation of the cam follower 16. The slots S1a, S2a are of different depths and are arranged asymmetrically around the circumference of the cam surface 42a, specifically at a 90° smallest angular separation in the illustrative example, so that rotational direction determination can be performed as already described with reference to FIGS. 2 and 3. The sleeve 40a may be disposed over a rotor of a nut or other rotating element. The illustrative sleeve 40a is a locking sleeve that includes locking features 120 (visible only in FIG. 6).

FIGS. 8 and 9 show perspective and end views, respectively, of a cam 40b comprising a lock sleeve with a cam surface 42b including a ring 122b formed by wire electrical discharge machining (EDM) or another technique and tack welded or otherwise attached to the sleeve. The ring 122b is a side surface of the sleeve 40b and includes bumps S1b, S2b of machined into the sleeve to serve as features for causing reciprocation of the cam follower 16. The bumps S1b, S2b are of different heights and are arranged asymmetrically around the circumference of the cam surface 42b, specifically at a 90° smallest angular separation in the illustrative example, so that rotational direction determination can be performed as already described with reference to FIGS. 2 and 3. The sleeve 40b also includes the locking features 120 (visible only in FIG. 8).

Figure 11:
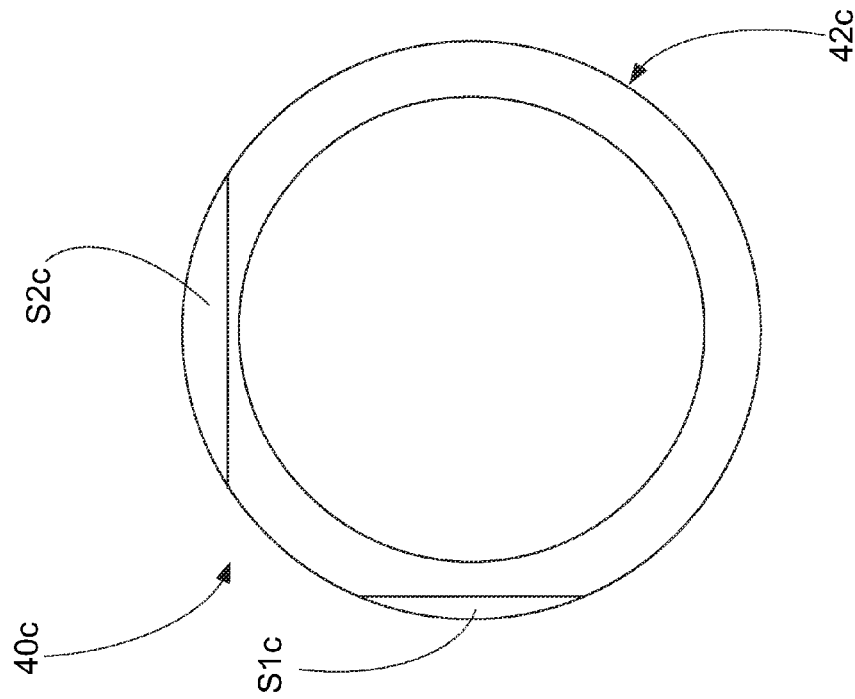
FIGS. 10 and 11 show perspective and end views, respectively, of another rotary element suitably employed in the sensor system of FIGS. 1 and 2, which employs magnetic modulation rather than mechanical reciprocation.
Figure 10:
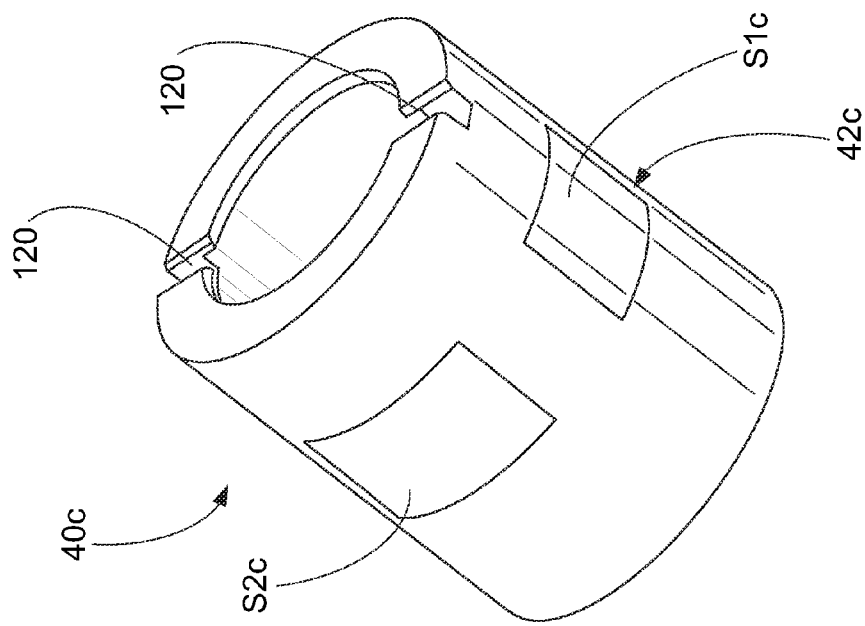

FIGS. 10 and 11 show perspective and end views, respectively, of a lock sleeve 40c with a side surface 42c including a ring formed by wire electrical discharge machining (EDM) or another technique and tack welded or otherwise attached to the sleeve. The ring includes slots filled with inserts S1c, S2c made of a magnetic material. In this approach, the cam follower 16 is replaced by a sensor arm made of a magnetic material that is magnetically coupled with the electrically conductive coil 12, and one or both of (i) the sensor arm and (ii) the inserts S1c, S2c are magnetized. The sensor arm need not be movable, because movement is not what causes the time-varying magnetic flux through the coil 12 in this embodiment. Rather, in this embodiment the magnetic flux flows through the coil when the magnetized inserts S1c, S2c move proximate to the sensor arm. Alternatively, if the sensor arm is magnetized and the inserts are not, then the magnetic flux is reduced when the (non-magnetized) inserts S1c, S2c move proximate to the (magnetized) sensor arm. In some embodiments, the side surface 42c having the one or more inserts S1c, S2c has a constant radius (as seen in FIGS. 10 and 11) so that the contact between the sensor arm and the side surface 42c remains uniform throughout each revolution. The inserts S1c, S2c may be of different sizes (as shown) or be made of different materials, and are arranged asymmetrically around the circumference of the side surface 42c, specifically at a 90° smallest angular separation in the illustrative example, so that rotational direction determination can be performed as already described with reference to FIGS. 2 and 3. The sleeve 40c also includes the locking features 120 (visible only in FIG. 10).

FIGS. 12 and 13 show perspective and end views, respectively, of a cam 40d comprising a lock sleeve with a cam surface 42d including a ring formed by wire electrical discharge machining (EDM) or another technique and tack welded or otherwise attached to the sleeve. The ring is a side surface of the sleeve 40d and includes bumps S1d, S2d of machined into the sleeve to serve as features for causing reciprocation of the cam follower 16. The bumps S1d, S2d are of different heights and lengths, and are arranged asymmetrically around the circumference of the cam surface 42d, specifically at a 90° smallest angular separation in the illustrative example, so that rotational direction determination can be performed as already described with reference to FIGS. 2 and 3. The sleeve 40d also includes the locking features.

Figures 14, 15:
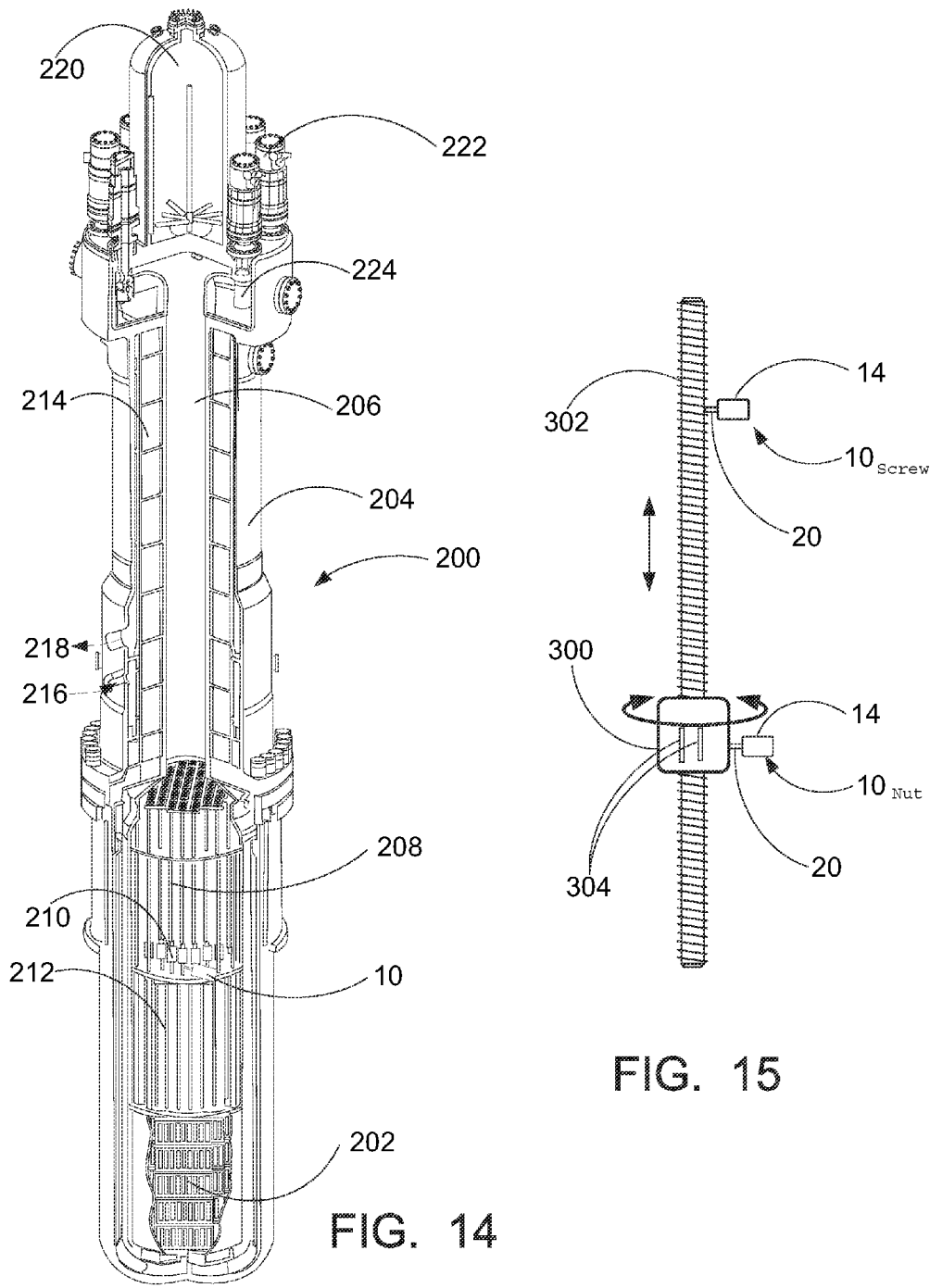
FIG. 14 diagrammatically shows a nuclear reactor of the integral pressurized water reactor (integral PWR) variety diagrammatically indicating placement of the sensor of FIG. 1 for measuring position and/or translation speed of the control rod assembly produced by a control rod drive mechanism (CRDM).
FIG. 15 diagrammatically shows mechanical components of a control rod drive mechanism (CRDM) including a nut engaging a screw, and further diagrammatically shows two suitable placements of the sensor of FIGS. 1 and 2 for measuring position and/or translation speed of the control rod assembly produced by the CRDM, one placement engaging the nut and the other engaging the screw.

With reference to FIG. 14, an illustrative nuclear reactor 200 is shown, of the pressurized water reactor (PWR) variety. The illustrative PWR 200 includes a nuclear reactor core 202 disposed in a pressure vessel 204. The reactor core 202 comprises a fissile material (e.g., $^{235}U$) immersed in primary coolant water. A cylindrical central riser 206 is disposed coaxially inside the cylindrical pressure vessel 204 and a downcomer annulus is defined between the central riser 206 and the pressure vessel 204. The illustrative PWR 200 includes internal control rod drive mechanisms (internal CRDMs) 208 with CRDM motors 210 that control insertion of control rods to control reactivity. Guide frame supports 212 guide the translating control rod assembly (not shown; typically each control rod assembly includes a set of control rods comprising neutron absorbing material yoked together by a spider and connected via a connecting rod with the CRDM). The illustrative PWR 200 is an integral PWR that includes an internal (or "integral") steam generator 214 located inside the pressure vessel, and more specifically in the downcomer annulus defined between the pressure vessel 204 and the central riser 206. Embodiments in which the steam generator is located outside the pressure vessel (i.e., a PWR with external steam generators) are also contemplated. The steam generator 214 is fed by a feedwater inlet 216 and deliver steam to a steam outlet 218. The illustrative PWR 200 includes an integral pressurizer 220 at the top of the pressure vessel 204 which defines an integral pressurizer volume; however an external pressurizer connected with the pressure vessel via suitable piping is also contemplated. Primary coolant water in the pressure vessel 204 is circulated by reactor coolant pumps (RCPs) comprising in the illustrative example external RCP motors 222 each driving an impeller located in a RCP casing 224 disposed inside the pressure vessel 204. It is to be appreciated that the PWR 200 is merely an illustrative example—the disclosed operating procedures are suitably employed in substantially any type of PWR.

With continuing reference to FIG. 14, for performing measurements of the CRDM motion during reactor operation, the sensor 10 is suitably disposed inside the pressure vessel 204, for example positioned for the contact portion of the cam follower to cam against a nut of the CRDM motor 210. While a single sensor 10 is diagrammatically shown in FIG. 14, it is to be appreciated that each CRDM motor may include such a sensor. If the total number of CRDMs is $N_{CRDM}$, then this requires $N_{CRDM}$ sensors, and $2 \times N_{CRDM}$ electrical wires (all signal wires; none carry power). It is to be further appreciated that the illustrative sensor 10 is shown oversize in FIG. 10 in order to be visible in the diagrammatic representation.

With reference to FIG. 15, two illustrative operational positions of the sensor 10 for monitoring movement in a CRDM are shown. The illustrative CRDM employs a nut-and-screw mechanism in which a rotary nut 300 driven by a motor (not shown; however, in some embodiments the nut 300 may be part of the motor rotor). The nut 300 is prevented from translating up or down by a suitable fixture (not shown), and rather a screw 302 engaged by the nut 300 translates up or down as the nut 300 rotates. The nut 300 serves as the cam 40 of FIG. 1, and its side surface serves as the cam surface 42 that is engaged by a sensor $10_{Nut}$ which is suitably the sensor 10 of FIGS. 4 and 5, for example. The side surface of the nut 300 (or a lock ring or lock sleeve attached thereto, e.g. as in the examples of FIGS. 8-13) suitably includes one or more features 304, e.g. two features 304 of different types that correspond to the features F1, F2 of FIG. 2 and enable both nut rotation speed (or distance) and nut rotation direction to be determined. The nut rotation speed or distance can be converted to linear translation distance of the screw 302 based on the thread pitch. (Note that if the pitch of the threads are known, then determination of rotation direction also determines whether the screw translation is upward or downward).

As also shown in FIG. 15, in an alternative approach a sensor $10_{Screw}$ (which again may be the sensor 10 of FIGS. 4 and 5, for example) engages the screw 302 directly. In this case the screw 302 serves as the cam which the contact portion 20 of the cam follower of the sensor $10_{screw}$ contacts. As the screw 302 moves upward or downward responsive to rotation of the nut 300. Each passage of one thread of the screw 302 produces a pulse (or other feature in the voltage-versus-time signal) and the corresponding distance is the thread pitch. This approach does not readily provide direction information; however, the angle of the pitch may provide enough difference in the signal feature for up-versus-down motion to ascertain the direction of translation of the screw 302. It is to be appreciated that this approach is also suitably applied to some other CRDM mechanisms. For example, in a rack-and-pinion mechanism the rack is analogous to the screw, and the same approach can be applied except that the sensor in the case of a rack-and-pinion mechanism senses passage of gear teeth of the rack, and the translation distance is computed based on the spacing of the gear teeth on the rack.

The approach of either sensor $10_{Nut}$ or sensor $10_{Screw}$ may be applied to an operational CRDM (e.g., as diagrammatically shown in FIG. 14), or can be applied to a test apparatus in which the CRDM is in a test pressure vessel.

While disclosed in the context of a nuclear reactor and for the task of sensing CRDM motion, the disclosed sensors and sensing approaches are applicable to other motion measurement tasks that may need to be performed in a high pressure environment (e.g., a pressure of at least 725 psia, and more particularly a pressure of at least 1450 psia in the case of a typical nuclear reactor) and/or a high temperature environment (e.g., at least 212° F. corresponding to boiling water at atmospheric pressure, and more particularly a temperature of at least 450° F. in the case of a nuclear reactor). It is contemplated to employ the disclosed sensing approaches at elevated pressure but room temperature, or at atmospheric pressure and elevated temperature, or at both elevated pressure and elevated temperature (as in the case of a nuclear reactor).

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

We claim:

1. An apparatus comprising:
a rotary cam including a side surface, and
a sensor including:
an electrically conductive coil,
a housing having an unsealed inner volume, the electrically conductive coil being sealed inside the housing and encircling the unsealed inner volume,
a cam follower including (i) a permanent magnet that is disposed in the unsealed inner volume and is magnetically coupled with the electrically conductive coil and (ii) a contact portion extending outside the housing, the cam follower being movable respective to the housing such that force applied to the contact portion moves the permanent magnet respective to the electrically conductive coil to generate an electrical signal in the electrically conductive coil; and
a spring disposed inside the unsealed volume that biases the cam follower toward a rest position such that force applied to the contact portion moves the engagement element away from the rest position against the spring and the spring returns the engagement element to the rest position upon removal of the force,
wherein the cam follower engages the side surface of the rotary cam, the side surface being shaped to produce reciprocation of the cam follower when the rotary cam rotates.

2. The apparatus of claim 1 wherein the unsealed inner volume is defined in part by a wall having an opening out of which the contact portion of the movable element extends, and the spring biases a stop of the movable element against the wall.

3. The apparatus of claim 2 wherein a gap between the movable element and the constricted opening of the wall is an unsealed gap.

4. The apparatus of claim 2 wherein the wall includes flow holes.

5. The apparatus of claim 1 wherein the cam follower includes a ferromagnetic main body and the permanent magnet is separate from the ferromagnetic main body and is magnetically connected to the ferromagnetic main body.

6. An apparatus comprising:
a rotary cam including a side surface, and
a sensor including:
an electrically conductive coil,
a housing having an unsealed inner volume, the electrically conductive coil being sealed inside the housing and encircling the unsealed inner volume, and
a cam follower including (i) a permanent magnet that is disposed in the unsealed inner volume and is magnetically coupled with the electrically conductive coil and (ii) a contact portion extending outside the housing, the movable element being movable respective to the housing such that force applied to the contact portion moves the permanent magnet respective to the electrically conductive coil to generate an electrical signal in the electrically conductive coil,
wherein the cam follower engages the side surface of the rotary cam, the side surface being shaped to produce reciprocation of the cam follower when the rotary cam rotates.

7. The apparatus of claim 6 further comprising:
a readout device connected to measure the electrical signal generated in the electrically conductive coil; and
an electronic data processing device configured to compute a rotation rate or rotation distance of the rotary cam based on the measured electrical signal.

8. The apparatus of claim 7 wherein
the rotary cam has a constant-radius side surface with N surface features producing N pulses in the measured electrical signal for each revolution of the cam, where N is greater than or equal to one, and
the electronic data processing device is configured to compute a rotation rate of the rotary cam as equal to the pulse frequency divided by N.

9. The apparatus of claim 7 wherein
the rotary cam has a constant-radius side surface with an asymmetric set of one or more features that produce a signal feature or a distinguishable time-reversed signal feature in the measured electrical signal depending upon rotation direction of the rotary cam, and
the electronic data processing device is further configured to determine rotation direction of the rotary cam based on detection of the signal feature or the time-reversed signal feature in the measured electrical signal.

10. The apparatus of claim 7 wherein the rotary cam is a nut of a control rod drive mechanism (CRDM) that engages a screw of the CRDM, and the electronic data processing device is further configured to compute a linear translation rate or linear translation distance of the screw based on the computed rotation rate or rotation distance and a thread pitch of the screw.

11. The apparatus of claim 10 wherein the rotary nut and the sensor are both disposed in water at a temperature of at least 212° F., and the unsealed inner volume of the housing of the sensor is filled with the water.

12. The apparatus of claim 11 wherein the sensor and the CRDM including the rotary nut are both is disposed in a nuclear reactor and are both immersed in primary coolant water of the nuclear reactor at a temperature of at least 450° F. and a pressure of at least 1450 psia, and the unsealed inner volume of the housing of the sensor is filled with primary coolant water.

13. An apparatus comprising:
   a control rod drive mechanism (CRDM) including a screw or a rack,
   a sensor including:
      an electrically conductive coil,
      a housing having an unsealed inner volume, the electrically conductive coil being sealed inside the housing and encircling the unsealed inner volume, and
      a cam follower including (i) a permanent magnet that is disposed in the unsealed inner volume and is magnetically coupled with the electrically conductive coil and (ii) a contact portion extending outside the housing, the movable element being movable respective to the housing such that force applied to the contact portion moves the permanent magnet respective to the electrically conductive coil to generate an electrical signal in the electrically conductive coil,
   wherein the cam follower engages the screw or rack such that threads of the screw or gear teeth of the rack produce reciprocation of the cam follower as the cam moves linearly.

14. The apparatus of claim 1 wherein the sensor is a passive sensor that does not receive electrical power and has only two electrical leads.

* * * * *